April 13, 1948.  J. D. KENNELLY  2,439,474
BRAKE PRESSURE RESPONSIVE SIGNAL SYSTEM
Filed June 10, 1946
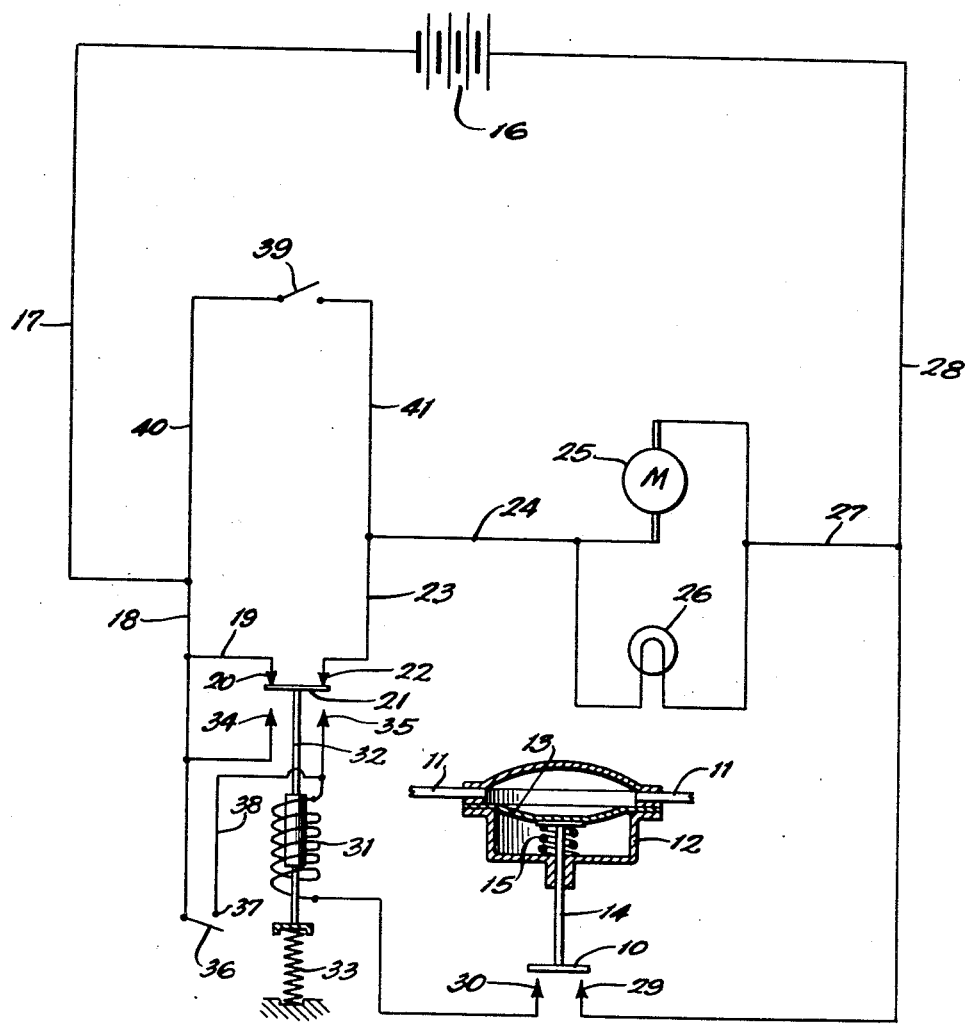
Inventor:
Jeremiah D. Kennelly,
By Dawson, Orth and Hungenberg,
Attorneys.

Patented Apr. 13, 1948

2,439,474

UNITED STATES PATENT OFFICE 2,439,474

BRAKE PRESSURE RESPONSIVE SIGNAL SYSTEM

Jeremiah D. Kennelly, Oak Park, Ill.

Application June 10, 1946, Serial No. 675,549

3 Claims. (Cl. 177—311)

This invention relates to signal apparatus and more particularly to light or other signal devices applicable to vehicles such as locomotives, railway trains, trucks, etc., in which air pressure and the like is employed for setting brakes.

Railway train accidents have occurred in recent years in which trains equipped with warning lights had stopped for unscheduled stops and a fast following train crashed into the rear of the stopped trains. Although the train making the unscheduled stop was equipped with a warning light, such lights remained inoperative because the stop was made under routine conditions which did not close the circuit of the light and no warning was, therefore, given.

An object of the present invention is to provide a signal device to be used at the rear of the trains, at the front of trains or at other points for signalling to trains behind or before that brakes are being applied by the train in question. Since considerable time is required to bring a fast moving train to a stop, the importance of such signal effect at times when the brake is being applied will be readily seen. A further object of the invention is to provide such signal apparatus which is rendered effective by a change of pressure in an air brake line, as when brakes are being applied or beginning to be applied, the signal light or device being continued in operation, irrespective of the restoration of normal pressure in the brake line, and until a manual switch is operated. It is a further object to provide manually operated means for restoring the light or other signal apparatus to operation after the light has been turned off following the automatic closing of the light circuit under the change of pressure in the air brake line. A still further object is to provide a signal system in conjunction with the air brake line in which the light is turned on by a drop in pressure in an air brake line and a system in which a failure in any part thereof will tend always to close the circuit in which the warning light is located. Other specific objects and advantages will appear as the specification proceeds.

The invention comprises broadly an electrical system combined with the air brake line of a vehicle having a warning light, the system responding to a change in pressure in either the main line of the train or in the individual brake application line of a car. Upon the actuation of the system by such a change in pressure, a warning light or other signal device is brought into operation and remains in operation until the circuit is opened by manual operation of a switch.

It will be understood that the system may be applied in a variety of modifications depending upon the particular air brake conduit to which it is applied, etc.

In the specific illustration given in the drawing, I illustrate the invention in connection with the main air brake line of the train which is maintained normally under high pressures say, for example, pressures running from 90 to 110 pounds in normal operation. It will be understood, of course, that the high pressure brake line communicates with reservoir tanks carried by each individual car and serves to maintain such tanks at the desired high pressure. Such cars are equipped with valves which are actuated by a drop in pressure of the main brake line so as to apply pressure from the reservoir to the individual brake application cylinder of the car. Such a system is well known and is in universal use, the purpose of the system being to insure the application of brakes in case of breaking of the main pressure line at some point. In the specific illustration, I provide a pressure-responsive switch 10 which is actuated by a drop in pressure in the main air brake line such as a drop occasioned by the application of brakes or the beginning of the application of brakes.

In the illustration given, 11 designates the train brake line and 12 a closed cylinder communicating with the line 11. Supported in the cylinder 12 is a diaphragm 13 to which is fixed the switch operating plunger 14. A spring 15 is employed and has a capacity for the raising of the plunger 14 when the pressure within line 11 drops a pre-determined amount say, for example, 10 pounds. It will be understood that the compressive strength of the spring 15 may be adjusted to provide actuation of plunger 14 upon the dropping of pressure in line 11 to any pre-determined extent.

16 indicates a battery for supplying current to the circuit. It will be understood that any source of current may be employed. Current is adapted to flow from the battery 16 through line 17, lines 18 and 19, contact 20, switch 21, contact 22, lead 23, lead 24, through the divided leads connecting the motor 25 and light 26, and thence through leads 27 and 28 back to the battery 16. The above circuit is, of course, conditioned upon the closing of the contacts 20 and 22 by the plunger bar 21, as illustrated in the drawing.

When the circuit of the motor and light is closed, as has just been described, the closing of the circuit has been effected by a reduction in pressure in line 11 which has resulted in the raising of plunger 14 and the breaking of the opening of the circuit between contacts 29 and 30. The solenoid coil 31 is de-energized and plunger 32 is raised under the influence of spring 33 to make the contact shown.

Manual means are provided for breaking the contact between points 20 and 22 and for maintaining the plunger 32 in a lower position. Spaced below contact 20 is the contact point 34 and spaced below contact 22 is the contact point 35. The two contacts communicate with a normally opened push switch 36. When the switch is pressed against the contact point 37, it closes the circuit, including the lead 38 which communicates with the solenoid coil 31, assuming that the contact points 30 and 29 are also connected by the bar 10.

In order to establish direct manual control over the light and motor circuit, I provide a master switch 39 which controls the lead 40 communicating with lead 17, and the lead 41 communicating with the lead 24.

The warning light may be of any suitable type of construction. For example, it may be of the motor actuated type illustrated in my copending application, Serial No. 570,946, now Patent No. 2,417,934, dated March 25, 1947, for Oscillating light signal device. In this structure, the warning light is actuated by a motor for oscillating the light to produce an effective warning signal.

Operation

Under normal operation, as the train, for example, is underway, a relatively high pressure is maintained in the brake line 11 and plunger 14 is pressed downwardly so as to make the contact between the points 29 and 30. Solenoid 31 is energized and plunger 32 is retracted under the influence of the solenoid so as to connect the points 34 and 35. Since the contacts 20 and 22 are open, no current flows through the motor and light circuits.

When the engineer applies the brakes or begins to apply the brakes, the pressure in the main brake line 11 is reduced as a means for setting into operation the reservoir operated brakes of the several cars. The reduction in pressure in line 11 above the pre-determined amount causes the spring 15 to raise diaphragm 13 and the plunger 14 breaks the contact between points 30 and 29. The solenoid 31 is deenergized and spring 33 raises the plunger 32 to connect the points 20 and 22. The warning light then goes on and is oscillated by the motor 25. Irrespective of any changes in pressure within line 11, the light circuit remains closed until the brakeman or some other employee manually breaks the circuit. This operation is accomplished by pushing the switch 36 into contact with point 37. Since the pressure within line 11 is very quickly restored following the movement of the brake lever, current will now flow from the battery through the switch 37, solenoid 31, contact points 30 and 29 and thence back through lead 28 to the battery. In this operation, solenoid 31 is energized and retracts the plunger 32 against the force of spring 33 bringing the contact bar 21 against the points 34 and 35. The current through solenoid 31 is maintained irrespective of the opening of switch 36 upon release thereof by the brakeman because current now flows through the bar 21 connecting points 34 and 35. The system is now again in condition for automatic operation upon the dropping of pressure within line 11 below the pre-determined amount.

In the event that the brakeman, after closing switch 36 and opening the light and motor circuit, discovers that a train is approaching and danger exists, he may operate the master switch 39 which will close the light and motor circuit irrespective of the condition of the other circuit and thus restore the light and motor to operation. It will be noted that the operation of the master switch does not disturb the condition of the remainder of the system which is ready to respond to automatic actuation upon the dropping of pressure within line 11.

It will be understood that the system may be readily changed to adapt it to different pressure line arrangements. For example, the pressure switch may be operated directly from a connection with the pressure line leading from the reservoir to the brake cylinder and in this position, the plunger 14 would be operated by an increase in pressure within the line rather than by a decrease. Other modifications, depending upon the point of connection between the pressure switch and brake line system may be readily made.

I prefer to employ the system as illustrated in the drawing in which all of the parts are arranged on the safety side and in which if any of the parts become inoperative, the spring 33 will close the light circuit to bring the warning light into operation.

While the invention has been described in connection with a specific embodiment or illustrative system, which has been set out in detail, it will be understood that such details may be modified widely by those skilled in the art without departing from the spirit of my invention.

I claim:

1. In combination with the air brake line of a vehicle equipped with an electric warning signal, means actuated by a change in pressure in said line, due at least to a partial application of brakes, for closing the circuit of said signal, means for maintaining said circuit closed even when the normal pressure in said line is restored, and manual means effective only after the normal pressure in said line is restored for opening said signal circuit and conditioning said apparatus for automatic operation again by said pressure change.

2. In combination with the air brake line of a vehicle equipped with an electric warning signal, means actuated by a drop in pressure in said line due to the application of brakes, for closing the circuit of said signal, means maintaining said circuit closed even when the normal pressure in said line is restored, and means effective only after the pressure has built up to a predetermined point for opening said signal circuit while conditioning said apparatus for automatic operation again by said pressure drop.

3. In combination with the air brake line of railway cars equipped with a warning light, a pressure-responsive switch connected to said pressure line and adapted to keep the switch closed under normal high line pressure by responding to a drop in pressure below a predetermined point to open said switch, a spring urged solenoid plunger operative upon the opening of said switch to close the circuit of said light, and a manually operated switch operative only after the said pressure-responsive switch has again been closed by pressure, for closing the circuit of said solenoid to open said light circuit and for establishing a second circuit including the coil of said solenoid to maintain said solenoid operative for holding the plunger in retracted position against the force of said spring.

JEREMIAH D. KENNELLY.

REFERENCES CITED

The following references are of record in the file of this patent:

UNITED STATES PATENTS

| Number | Name | Date |
|---|---|---|
| 1,891,655 | Stewart | Dec. 20, 1932 |
| 2,181,225 | Campbell | Nov. 28, 1939 |
| 2,408,660 | Lannge | Oct. 1, 1946 |